United States Patent
De Ruyck et al.

(10) Patent No.: US 7,866,160 B2
(45) Date of Patent: Jan. 11, 2011

(54) PROCESS AND INSTALLATION FOR PRODUCING ELECTRIC POWER

(75) Inventors: Jacques De Ruyck, Tervuren (BE); Svend Bram, Elsene (BE); Frank Delattin, Landen (BE)

(73) Assignee: Vrije Universiteit Brussel, Brussels (BE)

( * ) Notice: Subject to any disclaimer, the term of this patent is extended or adjusted under 35 U.S.C. 154(b) by 846 days.

(21) Appl. No.: 11/721,320

(22) PCT Filed: Dec. 6, 2005

(86) PCT No.: PCT/BE2005/000179

§ 371 (c)(1), (2), (4) Date: Jun. 8, 2007

(87) PCT Pub. No.: WO2006/060883

PCT Pub. Date: Jun. 15, 2006

(65) Prior Publication Data

US 2009/0229271 A1  Sep. 17, 2009

(30) Foreign Application Priority Data

Dec. 8, 2004  (EP) ................................ 04447270

(51) Int. Cl.
*F02C 6/18* (2006.01)
(52) U.S. Cl. ...................... 60/780; 60/39.511; 60/39.53
(58) Field of Classification Search .................... 60/780, 60/775, 781, 39.511, 39.52, 39.53, 39.55
See application file for complete search history.

(56) References Cited

U.S. PATENT DOCUMENTS

| 5,133,180 | A | | 7/1992 | Horner et al. |
| 5,669,216 | A | | 9/1997 | Ankersmit et al. |
| 5,934,065 | A | * | 8/1999 | Bronicki et al. .......... 60/39.181 |
| 6,585,784 | B1 | | 7/2003 | Mittricker |
| 2004/0206065 | A1 | | 10/2004 | Mittricker et al. |

FOREIGN PATENT DOCUMENTS

| DE | 196 27 189 A1 | 1/1998 |
| GB | 2 305 186 A | 4/1997 |
| WO | WO 01/42636 A1 | 6/2001 |

OTHER PUBLICATIONS

Adelman et al., "A Methane-Steam Reformer for a Basic Chemically Recuperated Gas Turbine." *Journal of Engineering for Gas Turbines and Power* 117(1995): 16-23.
Fiaschi et al., "The Recuperative Auto Thermal Reforming and Recuperative Reforming Gas Turbine Power Cycles With CO2 Removal—Part II: The Recuperative Reforming Cycle." *Journal of Engineering for Gas Turbines and Power* 126(2004): 62-68.

* cited by examiner

*Primary Examiner*—Michael Cuff
*Assistant Examiner*—Andrew Nguyen
(74) *Attorney, Agent, or Firm*—Merchant & Gould P.C.

(57) ABSTRACT

A process and an installation produces electric power or cogenerates electric and thermal power. A hydrocarbon fuel is enriched through an endothermic reforming reaction on a mixture of the fuel with steam or water. The heat for the reforming reaction is supplied by the combustion of a material, preferably biomass, different from the hydrocarbon fuel. The process integrates this reforming reaction in a gas turbine installation, wherein up to 12% of the exhaust gases of the gas turbine are used as comburant air for the combustion of the material. The process is shown to have little or even no impact on the gas turbine cycle performance when no reforming is applied.

18 Claims, 3 Drawing Sheets

US 7,866,160 B2

PROCESS AND INSTALLATION FOR PRODUCING ELECTRIC POWER

FIELD OF THE INVENTION

The present invention is related to a process and system for the operation of a gas turbine, involving methane-steam reforming of natural gas, used in the gas turbine's combustor.

STATE OF THE ART

Methane-steam reforming in gas turbine cycles is known. Two relevant papers in this respect are 'A methane-steam reformer for a basic chemically recuperated gas turbine', Adelman et al, Transactions of the ASME, vol 117, January 1995 (pp. 16-23) and more recently 'The recuperative auto thermal reforming and recuperative reforming gas turbine power cycles with CO2 removal—Part II: The recuperative reforming cycle', Fiaschi et al Transactions of the ASME, vol. 126, January 2004 (pp. 62-68). Such 'Chemically Recuperated Cycles' use a methane-steam reformer in order to extract heat from the full gas turbine exhaust stream, and transform this heat into chemical energy in the syngas (Adelman). Temperatures in the gas turbine exhausts are however too low to achieve a high amount of reforming, and the obtained energy recovery is therefore too limited for practical application. Fiaschi et al overcome this problem by adding post-combustion of natural gas in the full exhaust of the gas turbine. They use the reforming not for purposes of heat recovery, but to capture $CO_2$ from the fuel feed prior to the combustion process.

Another application of reforming is described in documents WO-A-0142636 and US20040206065. In these documents a reforming process is proposed to enrich fuels with low methane concentration with hydrogen. The syngas is dried in order to deliver a syngas suitable for use in gas turbines. The process integration is not further detailed. Document GB-A-2305186 is related to a fuel reforming apparatus and electric power generating system, wherein reforming of fuel gas takes place through a partial combustion of the gas, while mixing the gas with steam. The proposed process cannot be applied directly to biomass because the combustion gases enter the gas turbine expander.

Document DE19627189 proposes the use of reforming to replace part of the natural gas by coal in a repowered coal steam plant. The reformer is included in the bottom part of the coal furnace, where heat from the coal is used to realize the reforming reaction. The comburant air for the coal combustion is either atmospheric air, or a mixture of air with all of the turbine exhaust gases. Document DE19627189 is applicable only to coal plants repowered with a gas turbine, it is not applicable to highly efficient natural gas combined cycles. There is no further process integration.

Power production from biomass can occur through conventional external combustion (steam cycle, organic Rankine Cycle, Stirling engines), or internal combustion after gasification or pyrolysis (gas engine, Integrated Gasiffrcation Combined Cycle). External combustion has the disadvantage of delivering limited conversion efficiencies (max 30-35%), but it is easier to achieve and it needs no severe gas cleaning. Internal combustion has the potential of high efficiencies, but it always needs a severe and mostly problematic gas cleaning.

AIMS OF THE INVENTION

The present invention aims to provide an alternative heat source for the methane-steam reforming process, incorporated into a gas turbine installation.

SUMMARY OF THE INVENTION

The present invention discloses a new process and installation as disclosed in the appended claims. The invention allows to combine natural gas with the combustion of a combustible material other than the gas, in any type of gas turbine plant. According to the preferred embodiment, biomass is used as the combustible material in question. The process avoids any contact between the biomass combustion gases and the internals of the turbine, and is shown to have little or even no impact on the gas turbine cycle performance. In this process, the biomass is used as energy source to provide heat for the endothermic methane-steam reforming reaction, yielding hydrogen, carbon monoxide and carbon dioxide as reaction products. According to the invention, this reforming uses an external heat supply, obtained from the (external) combustion of biomass at 600 to 750° C. The heat contained in the biomass combustion flue gas can thus be transmitted to the natural gas and steam mixture, and transformed into chemical energy through formation of hydrogen. The biomass combustion gases do not mix with the natural gas fuel or with any other flow through the gas turbine, thus avoiding problems such as fouling or corrosion and consequent severe gas cleaning. The obtained syngas can be used in a gas turbine without significant loss of cycle efficiency when using the proposed heat exchanger network in the periphery of the reformer. Biomass can therefore be transformed into electric power at nearly the same efficiency as the considered gas turbine plant, which in the case of combined cycles can exceed 50%.

SHORT DESCRIPTION OF THE DRAWINGS

DETAILED DESCRIPTION OF THE INVENTION

Figure 1:
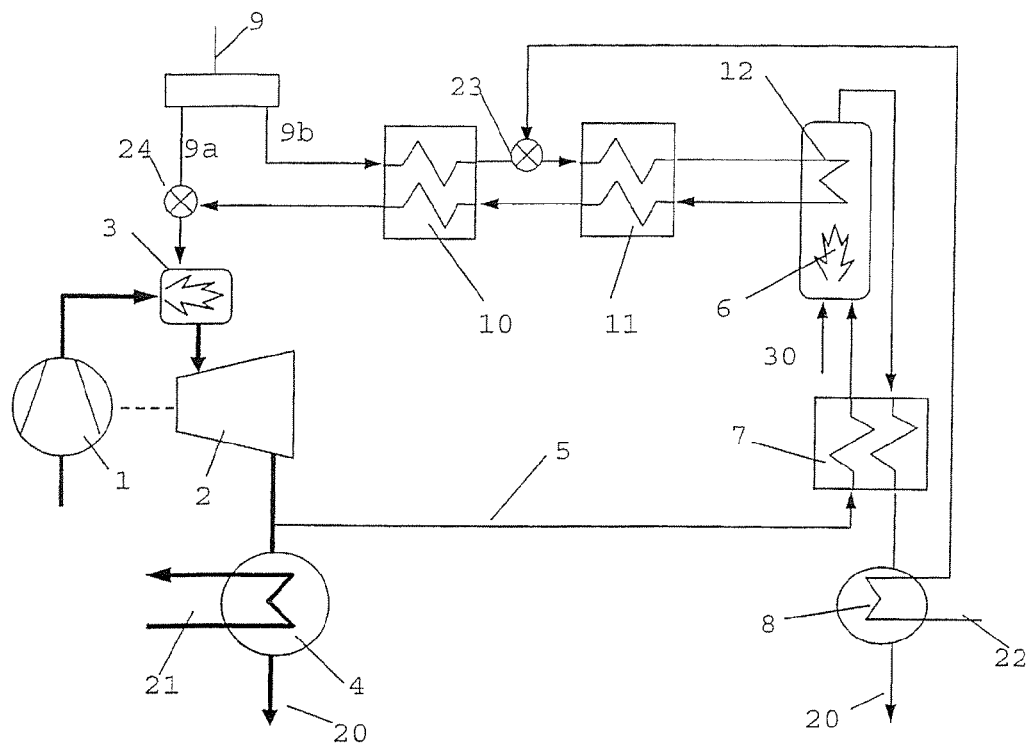
FIG. 1 represents the basic embodiment of a system according to the invention.

The process of the invention can be described as comprising the following steps, with reference to FIGS. 1 to 4:

providing a supply 9 of natural gas, providing a supply 22 of water, possibly, pre-heating (10) all or a part 9*a* of the natural gas supply, mixing the (pre-heated) natural gas and the water to obtain a mixture. The mixture can be obtained either by producing steam (8) and mixing it (23) with the pre-heated natural gas, or by pre-heating the water supply and mixing it with the (non-pre-heated) natural gas in a saturation tower 13, pre-heating (11) the mixture, combusting a supply 30 of combustible material, different from the natural gas supply, and using the heat produced by the combustion to heat up the mixture without direct contact between the mixture and the combustion gases of the combustion (12), in order to provoke methane-steam reforming reactions to take place in the mixture, thereby obtaining an enriched natural gas. According to the preferred embodiment of the invention, the combustible material used is biomass.

cooling the enriched natural gas (11,10) to a temperature above the dewpoint, using the enriched natural gas as fuel in the combustion chamber 3 of a gas turbine installation, According to the invention, the process further comprises the steps of:

using a part of the exhaust gases (5) of the gas turbine installation, as comburant air for the combustion of combustible material. According to the preferred embodiment, the amount of exhaust gases diverted for this use is maximum 12% of the gas turbine exhaust stream.

using the combustion gases of the combustion for pre-heating said exhaust gases, and for the heating of the water supply, either to produce steam, or to pre-heat the water prior to its entry in the saturation tower.

FIGS. 1 to 4 will now be described in more detail, in order to fully explain the prominent embodiments of the process described above. The following explanation also serves as a full disclosure of the installation of the invention, and its various embodiments.

The basic installation is shown in FIG. 1. A standard gas turbine plant with compressor 1, expander 2 and combustion chamber 3 is used. The gas turbine may be part of a Combined Cycle, in which case steam (21) is produced downstream of the gas turbine exhaust in heat exchanger 4 and used for extra power production through expansion in steam turbines (not shown), while the exhaust gases flow towards the stack 20. Items 1 to 4 are conventional equipment in a conventional process. The invention consists in the addition of the items 5 to 12.

According to the process of the invention, a part of the turbine exhaust is diverted through conduit 5 as comburant air to a combustor 6, being a biomass combustor, fed by a biomass supply 30, according to the preferred embodiment. According to a preferred embodiment, the amount of diverted turbine exhaust gases is proportional to the amount of biomass burnt, provided the excess oxygen level of the biomass combustor is kept constant (6% excess oxygen has been assumed). According to simulation, the replacement of each 1% of natural gas by biomass thus needs about 1.2% of the turbine exhaust gases as comburant air. The theoretical maximum of heat which can be supplied to the reformer corresponds to 100% reforming of the methane and represents about 10% of the natural gas feed 9, which puts the maximum of turbine exhaust diversion (proportional to the amount of biomass burnt) to about 12%. In reality, it is difficult to transform all of the methane in a single allothermal reformer and a realistic limit is about 5% replacement, corresponding to about 6% of turbine exhaust diversion.

The steam production in the bottoming cycle 21 is reduced accordingly with maximum 6% depending on the amount of biomass. The comburant air is preheated through a regenerator 7 prior to the biomass combustion chamber 6. The heat for this regeneration is supplied by the combustion gases of the biomass combustion. The biomass stack gas is used to heat water supply 22 in order to produce steam in the heat exchanger 8. Because of similar temperatures and flow rates, this extra amount of steam is almost equivalent to the reduced amount of steam in the bottom cycle 21.

Part of the natural gas feed 9 is preheated through a regenerator 10, after desulfurization (not shown). In a mixer 23, this gas is mixed with the steam coming from the boiler 8. The gas/steam mixture is further preheated through a regenerator 11, before entering the reformer 12 at about 600° C. The amount of gas is adjusted to achieve a molar steam to carbon ratio of 1.5 to 2 in the reformer 12. Heat is taken from the biomass combustion gases to feed the reforming reactions, which essentially consist of the following

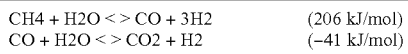

| $CH_4 + H_2O <> CO + 3H_2$ | (206 kJ/mol) |
| $CO + H_2O <> CO_2 + H_2$ | (−41 kJ/mol) |

The temperature during this reaction is preferably in excess of 600° C. up to 750° C. The reforming reaction is endothermic, and the gas stream thus absorbs a part of the energy from the biomass combustor 6. The produced enriched gas, also called 'syngas', thus contains up to 5% energy obtained from biomass through the reforming process, mainly through hydrogen enrichment. The syngas is next cooled in regenerators 11 and 10, thereby pre-heating the mixture and the natural gas supply respectively. The enriched gas can be cooled to some 100° C. to 200° C. depending on the gas turbine specifications, but its temperature must be kept above the gas dewpoint. If possible, the syngas temperature should be kept at 300° C. or more to achieve the highest marginal efficiency for the biomass. The enriched gas is then mixed with the non-enriched gas stream in mixer 24, after which this mixture is fed to the gas turbine's combustion chamber 3.

Figure 2:
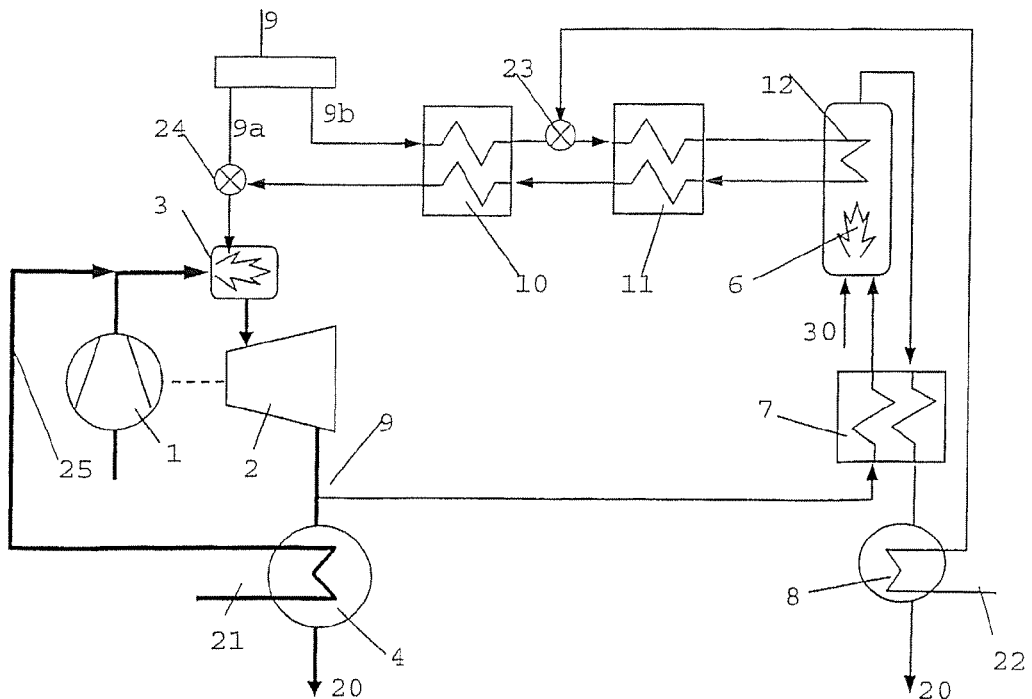
FIG. 2 represents a first variant of the system, involving a steam-injected gas turbine.

A second embodiment of the process and installation of the invention is shown in FIG. 2. The installation comprises an additional conduit 25 for the injection of steam, produced in the heat exchanger 4, into the gas turbine's combustion chamber 3. In the basic cycle of FIG. 1, it can be shown that a significant increase in the combustor inlet gas temperature is needed to keep the overall cycle efficiency constant (400° C. or more for replacement of 5% natural gas by biomass). When applying the process directly in steam injected gas turbines, as shown in FIG. 2, it can be shown that the cycle efficiency can be kept constant without the necessity of such an increase.

Figure 3:
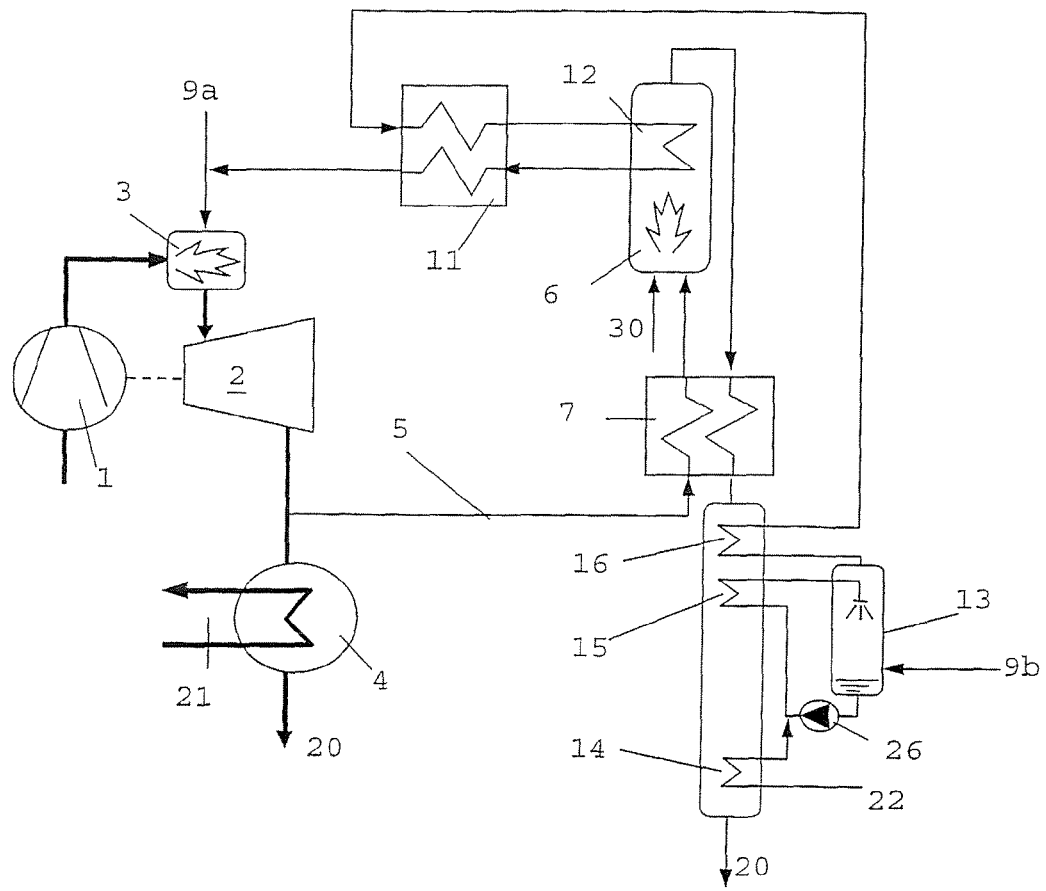
FIG. 3 represents a second variant of the system, involving a natural gas saturation tower.

According to a third embodiment, shown in FIG. 3, instead of producing steam in a boiler, the natural gas is mixed with water which has been pre-heated in the liquid phase, the mixing and the evaporation taking place in a saturation tower 13. In such a saturation tower, the evaporation of the water occurs at a non-constant temperature, and the exiting gas is almost saturated with water. In this case, the feedwater 22 is preheated in the liquid phase by the biomass combustion gases in heat exchanger 14. Both streams are mixed in countercurrent in the saturation tower 13 where excess water is circulated through a pump 26, taking up heat in the liquid phase from the biomass combustion gases in heat exchanger 15. After exit of the tower, the mixture is further preheated by the biomass combustion gases in heat exchanger 16, and routed to the syngas regenerator 11. The remainder of the installation is identical to the basic scheme of FIG. 1. The installation of FIG. 3 allows less stringent quality requirements of the consumed water, because of the washing effect of a saturation tower, and because salts are concentrated in the recirculating water rather than being injected in the gas turbine. Desulfurisation can be included in the saturation tower through the washing effect of the water spray. The recirculating water concentrates salts and sulfur residues and needs refreshment.

Figure 4:
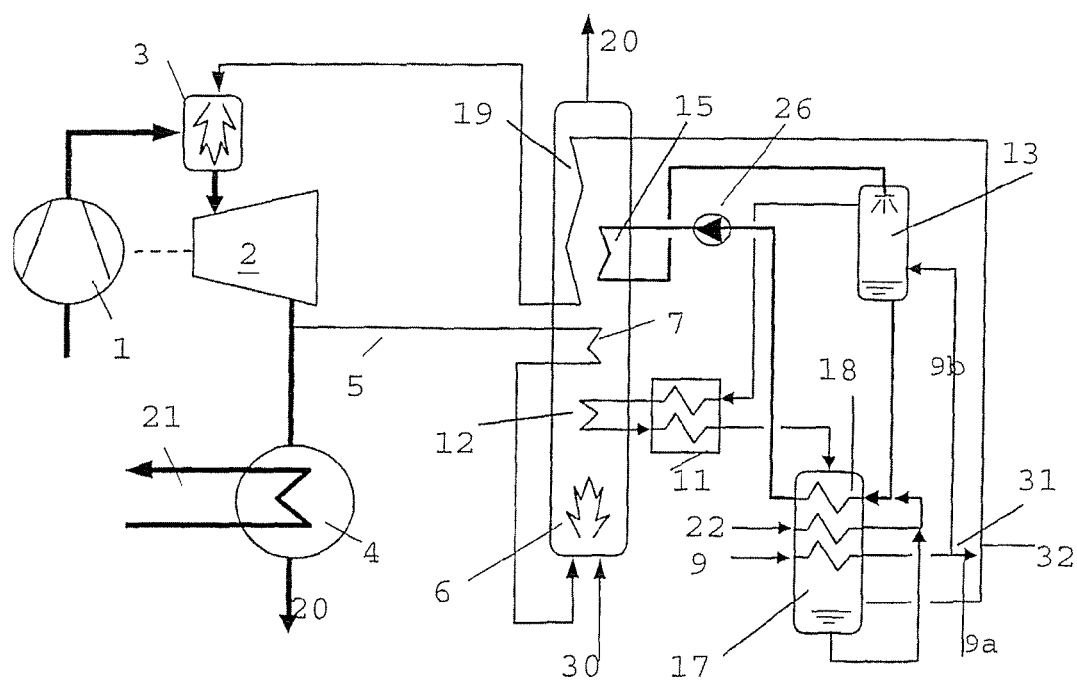
FIG. 4 represents a third variant of the system, involving a means for drying the syngas.

A fourth embodiment is shown in FIG. 4. This installation is equipped with a means for further cooling and drying the syngas after the regenerator 11. This is achieved with a condenser 17, which uses the water and natural gas feeds (22,9) as coldest coolants. After the condenser, the gas stream is split (31) into streams 9a and 9b, the latter being fed to the saturator 13 and on towards the reformer 12. The enriched gas is mixed again (32) with the non-enriched gas stream 9a, before going to heat exchanger 19. After the condenser, the feedwater is mixed with condensed water from the condenser itself. This rerouting of the condense water reduces the amount of consumed water by about 65%. The mix of feedwater/condense water is then mixed with the water leaving the saturation tower 13, and this mixture is further used as major coolant (18) in the condenser. After 18, the water flow is circulating back to the tower through pump 26, the circulating water being itself heated in the liquid phase in heat exchanger 15.

The syngas obtained in the saturation tower, is heated in the regenerator 11, and reformed in the reformer 12, as in the previous embodiments. After being cooled in the condenser 17, the cold syngas is reheated by the biomass combustion gases in heat exchanger 19, before entering the gas turbine's combustion chamber 3.

Compared to the basic system of FIG. 1 and the embodiment of FIG. 3, the drying of the syngas allows to reduce considerably the water consumption and it can be shown that the overall efficiency slightly improves.

Figure 5:
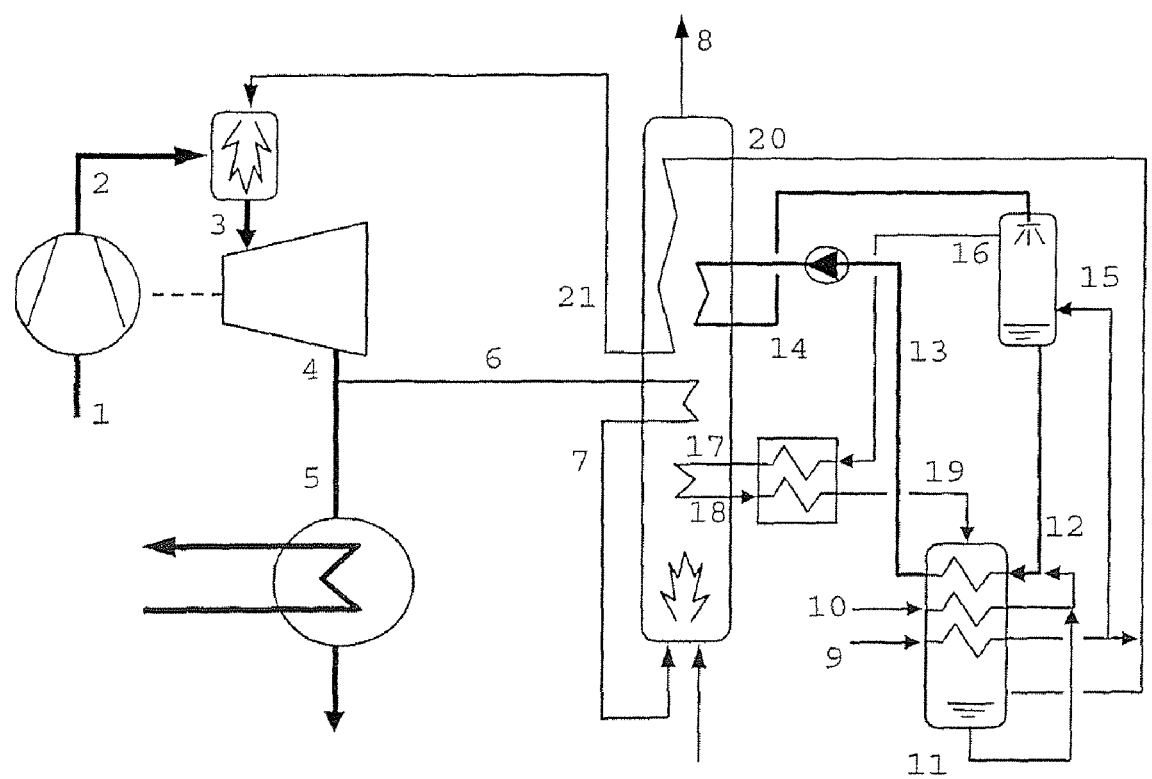
FIG. 5 illustrates a working example based on the installation of FIG. 4.

FIG. 5 shows the result of a thermodynamic simulation of the process described in FIG. 4. The pressure ratio is assumed to be 20, the turbine inlet temperature is 1273° C., isentropic efficiencies in compressor and turbine are 90%. The gas supply is assumed to be pure methane. The head loss in the main combustor is 5%, and 3% in the other components. 10% of the compressor flow is assumed to bypass the turbine for cooling purposes. The process is calculated for a reference mass flow rate of 1 kg/s in the compressor. The saturator exit temperature is adjusted to yield a Steam to Carbon ration of 2 in the reformer, and the amount of gas in 9b is adjusted to yield a power contribution from biomass of 5%, leading to a water consumption of 0.0056 kg/s. The gas reaching the combustor (3) consists of (by volume) 39.5% hydrogen 49.3% methane, 7.1% carbon dioxide, 3.7% carbon monoxide and 0.3% water. In conclusion, a cycle efficiency is found of 54.9%, which is the same as the cycle efficiency obtained if no addition of biomass is assumed, provided the combustor gas is heated to 440° C. The example is given as illustration and is not limitative.

Table 1 lists the heat fluxes in the different components, according to the numbering in FIG. 4. Table 2 lists the flow properties according to the numbering in FIG. 5. The numbering FIG. 5 is only to be read in combination with the data in table 2, not with the remainder of this description.

TABLE 1

| Component (FIG. 2) | Exchanged heat (kJ per kg compressor flow) |
| --- | --- |
| 07 regenerator | 13 |
| 11 regenerator | 31 |
| 12 reformer | 41 |
| 13 feedwater saturator | 9 |
| 17 gas preheating | 1 |
| 17 water preheating | 1 |
| 18 main condensation | 49 |
| 19 gas reheater | 27 |

TABLE 2

| Stream (FIG. 5) | flow(kg/s) | Temp(C.) |
| --- | --- | --- |
| 1 compressor in | 1.000 | 20 |
| 2 compressor out | 1.000 | 444 |

TABLE 2-continued

| Stream (FIG. 5) | flow(kg/s) | Temp(C.) |
| --- | --- | --- |
| 3 combustor out | 1.024 | 1273 |
| 4 turbine out | 1.024 | 531 |
| 5 to bottom HRS | 0.959 | 531 |
| 6 to biomass combustor | 0.064 | 531 |
| 7 after preheating | 0.064 | 650 |
| 8 biomass stack | 0.065 | 100 |
| 9 natural gas in | 0.018 | 20 |
| 10 water in | 0.005 | 20 |
| 11 condensor knock-out | 0.014 | 50 |
| 12 saturator knock-out | 0.050 | 49 |
| 13 water recirculation | 0.071 | 185 |
| 14 water saturator in | 0.071 | 211 |
| 15 gas saturator in | 0.007 | 40 |
| 16 gas saturator out | 0.027 | 196 |
| 17 gas mixture reformer in | 0.027 | 650 |
| 18 syngas reformer out | 0.027 | 700 |
| 19 syngas condensor in | 0.027 | 285 |
| 20 gas mixture reheater in | 0.024 | 50 |
| 21 gas combustor in | 0.024 | 441 |

The invention claimed is:

1. A process for the production of electric power or cogeneration of electric and thermal power by operating a gas turbine plant, comprising a compressor, a combustion chamber and an expander, the process comprising the steps of:
   providing a supply of a hydrocarbon fuel,
   providing a supply of water,
   mixing at least a part of the fuel supply with the water supply to obtain a mixture,
   pre-heating the mixture,
   combusting a supply of combustible material, different from the hydrocarbon fuel supply, and using the heat produced by the combustion to heat up the mixture without direct contact between the mixture and the combustion gases of the combustion, in order to provoke methane-steam reforming reactions to take place in the mixture, thereby obtaining an enriched fuel,
   feeding the enriched fuel to the combustion chamber of the gas turbine plant,
   using a part of the exhaust gases of the gas turbine plant, as comburant air for the combustion of combustible material,
   using the combustion gases of the combustion of combustible material for pre-heating said exhaust gases,
   using the combustion gases of the combustion of combustible material for heating the water supply.

2. The process according to claim 1, wherein the supply of combustible material is a biomass supply.

3. The process according to claim 1, wherein the hydrocarbon fuel is natural gas, the reforming step yielding an enriched gas.

4. The process according to claim 1, further comprising the step of cooling the enriched fuel after the reforming step, and prior to feeding the enriched fuel to the combustion chamber of the gas turbine plant.

5. The process according to claim 4, wherein the hydrocarbon fuel is natural gas, and wherein the cooling is performed to a temperature above the dewpoint of the gas.

6. The process according to claim 4, wherein the cooling is performed in a first regenerator heating up the mixture, and in a further regenerator heating up the supply of hydrocarbon fuel.

7. The process according to claim 1, wherein the water supply is heated by the combustion gases to produce steam, and wherein the mixture is obtained by mixing the fuel with the steam.

8. The process according to claim 1, wherein the water supply is heated in the liquid phase by the combustion gases, and wherein the mixture is obtained by mixing the fuel with the heated water in a saturation tower, and wherein water is collected in the tower and recirculated to combine with the water supply.

9. The process according to claim 5, further comprising the steps of
drying the enriched gas, this step being performed after the step of cooling the enriched gas to a temperature above the dewpoint, this step including a further cooling down of the enriched gas,
heating up the dried gas, by using the heat of the combustion gases.

10. The process according to claim 9, wherein the drying step takes place in a condensor, in which at least the water supply and the hydrocarbon fuel supply are used as cold sources.

11. The process according to claim 1, wherein the exhaust gases of the gas turbine are used to produce steam in a circuit, and wherein at least a part of the steam is injected into the combustion chamber of the gas turbine plant.

12. The process according to claim 1, wherein maximum 12% of the exhaust gases of the gas turbine are used as comburant air for the combustion of combustible material.

13. An installation comprising at least:
a gas turbine plant, comprising a compressor, a combustion chamber and an expander,
a supply of hydrocarbon fuel,
a supply of water,
a mixer for mixing the water with the hydrocarbon fuel,
a combustor of a combustible material other than said fuel, and a heat exchanger for applying the heat of the combustion of said material, to a mixture obtained in the mixing means, so that a methane-steam reforming may take place essentially in said heat exchanger, yielding an enriched fuel,
a first regenerator arranged for pre-heating the mixture, while cooling down the enriched fuel,
diverter for diverting a part of the exhaust gases of the gas turbine plant, to be used as comburant air for the combustion of said material,
a second regenerator arranged for pre-heating said part of the exhaust gases from said gas turbine plant, while cooling down the combustion gases of the combustion of combustible material,
at least one heat exchanger, arranged for heating up said water supply, while cooling down said combustion gases.

14. The installation according to claim 13, wherein said mixer is a saturation tower.

15. The installation according to claim 14, further comprising a pump arranged for recirculating water coming from said saturation tower.

16. The installation according to claim 13, further comprising an additional heat exchanger, arranged for using the heat from the exhaust of said gas turbine expander, to produce steam, and further comprising a second diverter for diverting at least a part of the steam produced in said additional heat exchanger, towards the combustion chamber of said gas turbine plant.

17. The installation according to claim 13, further comprising a condensor arranged to further cool down said enriched hydrocarbon fuel, after said first regenerator.

18. The installation according to claim 17, wherein said condensor is arranged to receive at least said water supply and said hydrocarbon fuel supply as cooling mediums.

* * * * *